June 14, 1966  H. POREPP  3,255,504
SLIDE FASTENERS
Filed Dec. 24, 1962  2 Sheets-Sheet 1

Hans Porepp
INVENTOR.

BY  Karl F. Ross
AGENT

June 14, 1966  H. POREPP  3,255,504
SLIDE FASTENERS
Filed Dec. 24, 1962  2 Sheets-Sheet 2

Hans Porepp
INVENTOR.

BY Karl G. Ross
AGENT

United States Patent Office
3,255,504
Patented June 14, 1966

3,255,504
SLIDE FASTENERS
Hans Porepp, Essen, Germany, assignor to Opti-Holding A.G., Glarus, Switzerland, a corporation of Switzerland
Filed Dec. 24, 1962, Ser. No. 246,780
Claims priority, application Germany, Feb. 6, 1958, 5,994, 5,995
8 Claims. (Cl. 24—205.13)

This application is a continuation-in-part of application Serial Nos. 791,398, filed February 5, 1959, now U.S. Patent No. 3,069,723 and 48,477, filed August 9, 1960, now abandoned.

My present invention relates to slide fasteners of the type wherein each fastener half is made in the form of a continuous flexible chain, preferably integrally molded from plastic material, having links rigidly interconnected at one side of the chain (hereinafter envisaged, for convenience, as the bottom or lower side), the links being formed on the other side of the chain (i.e., the top or upper side) with heads interlockingly engageable with like heads on a co-operating fastener half.

The general object of my invention is to provide a fastener of this type whose halves may be conveniently and securely attached to a strip of fabric or other sheet material, such as the usual fastener tapes, and which at the same time can be mass produced preferably by techniques disclosed and claimed in my above-identified copending applications.

It is also an object of this invention to provide a fastener member of this character adapted to be secured to its supporting strip by fillets, i.e., narrow, elongated tapes, cords or the like, which can serve not only as attaching elements but also as guards designed to protect its links from deformation under heat and pressure during ironing or pressing operations.

A more specific object, allied with the preceding one, is to provide a fastener structure adapted to guide an associated slider in such manner as to avoid excessive wear of the fillet or fillets serving as part of the attaching means.

These objects are realized, in accordance with my instant invention, by the provision of a fastener member of the type set forth above wherein each link is fashioned on either or both of its sides, i.e., on the surface opposite the supporting strip (if the fastener member merely rests against one side thereof) or on its two exposed surfaces (if the member straddles the edge of the strip), with one or more notches aligned with all the notches on the same side to form a channel paralleling the strip edge, a fillet being thus receivable in the aligned notches to hold the fastener member in place as the fillet itself is secured (e.g., stitched) to the fabric at locations between successive fastener heads.

The use of the fillet is particularly desirable since, even if it projects but slightly beyond the fastener surface, it will help protect the links of the fastener from damage to it upon, for example, the passing of a flatiron over the strip. Where such considerations are not paramount, however, a simple thread fully received within the notches may suffice; in particular, such thread may be one of two threads co-operating to form a double chain stitch as is well known per se.

The above and other objects, features and advantages of my invention will become more fully apparent from the following detailed description, reference being made to the accompanying drawing in which.

Figure 5:
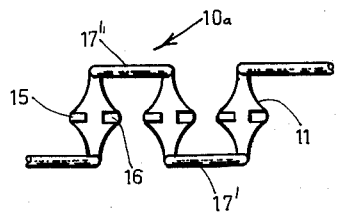
FIG. 5 is a fragmentary bottom view of the fastener member shown in FIG. 4.
Figure 4:
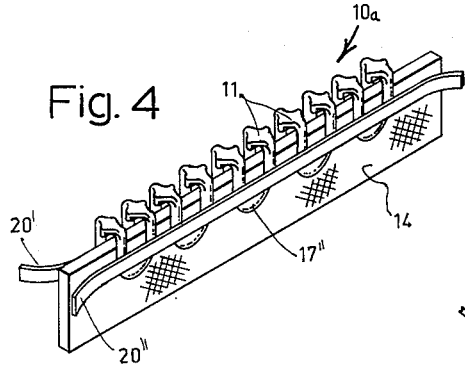
FIG. 4 is a perspective view of a length of fastener member, produced by the process shown in FIGS. 1–3, together with a strip of fabric straddled thereby and secured to it through a pair of fillets.
Figure 1:
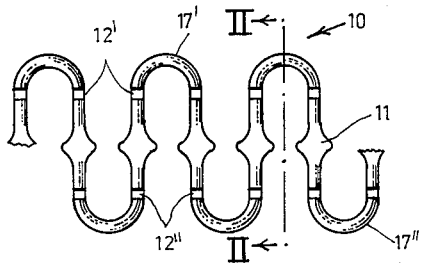
FIG. 1 is a plan view of a meandering plastic rod adapted to be shaped into a fastener element of the type disclosed in my copending application Ser. No. 48,477.
Figure 6:
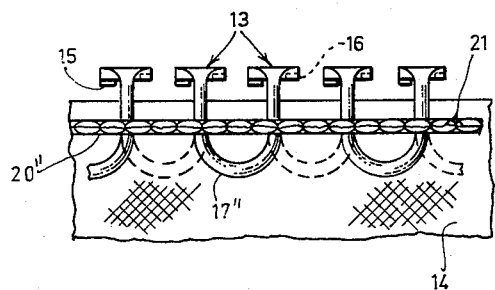
FIG. 6 is a side-elevational view of the same fastener member and its supporting strip.
Figures 2, 3:
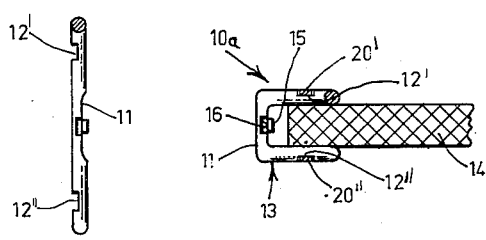
FIG. 2 is a cross-sectional view taken on line II—II of FIG. 1.
FIG. 3 is another cross-sectional view, illustrating a further step in the manufacture of the fastener.
Figure 11:
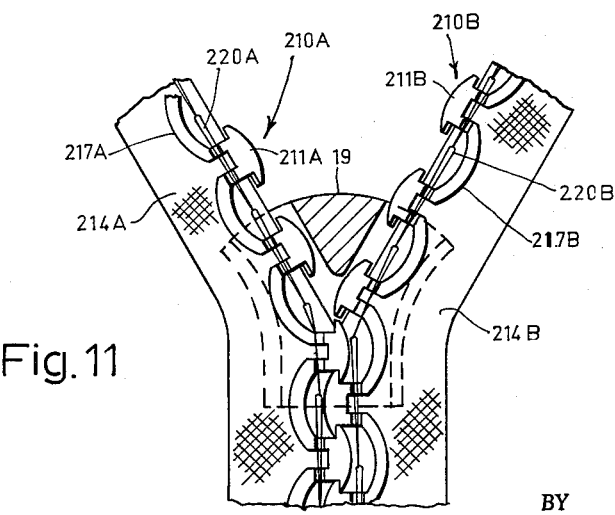
FIG. 11 is a side view of a complete fastener including members of the type specifically illustrated in FIG. 10.

In FIGS. 1 and 2 I have shown a rod or filament 10 of a preferably molecularly oriented, thermally softenable plastic material (e.g., a polyvinyl or polyacrylate) which has been bent into undulating shape within a single plane and has also been deformed, preferably immediately upon being undulated as more fully described in my copending application Ser. No. 48,477, so as to exhibit flattened enlargements 11 along its axis. At substantially the same time there have been formed incisions 12′, 12″ in each undulation on opposite sides of the enlargements 11. Next, as illustrated in FIG. 3, the undulating filament 10 is bent in a transverse plane at an elevated temperature so as to form a series of generally U-shaped links 13 which straddle a strip of fabric 14, each enlargement 11 being disposed at the bight of the U of a respective link and spaced from the strip edge so as to form one of a series of longitudinally separated heads by which the resulting fastener member 10a coacts with a similar fastener member on another strip (not shown). Advantageously, in order to secure the two fastener members against relative transverse displacement upon their interengagement, the heads 11 are provided with complementary formations, such as projections 15 and indentations 16 (see also FIGS. 5 and 6), which interlock with those of the other fastener member when the two members are brought into mesh by the usual slider action. It will be noted that the limbs 17′, 17″ of the fastener, by which successive links 13 are interconnected, extend below the fabric edge so as to define a guide path (FIG. 4) for a conventional slider 19 (FIG. 11). A pair of fillets 20′ and 20″ in the shape of narrow tapes, received in the aligned notches 12′ and 12″, lie above this guide path so as to be kept out of contact with the reciprocating slider. Stitching 21, passing through the fillets 20′, 20″ and the strip 14 between the successive links 13, serves to attach these fillets to the strip and thereby to hold the fastener member 10a in place (FIGS. 4 and 6).

Figure 7:
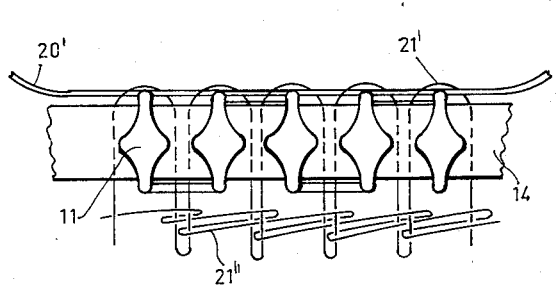
FIG. 7 is a top view of the fastener member and strip shown in FIG. 6, illustrating an alternate mode of attachment.

In FIG. 7 only a single fillet 20′ has been provided, this fillet being held in the grooves 12′ of the fastener member 10a and onto the fabric strip 14 by a thread 21′ while a second thread 21″ interlinks with the loops of this thread and lodges in the grooves 12″ of the fastener. The threads 21′ and 21″, when pulled tight, form a so-called double chain stitch which is particularly suitable for use in conjunction with a meandering fastener member as shown at 10a because the fastener links are securely engaged thereby on all sides. The fillet 20′ could, if desired, also be omitted so that the fastener member is held only by the double chain stitch 21′, 21″. Since most conventional threads tend to shrink upon the usual steaming and/or dyeing treatment to which fastener tapes are customarily subjected, the loops will become even tighter in response to such treatment to insure a still firmer attachment of the fastener to the fabric 14 which projects into the recess 22 of each link 13 defined by the legs of the U.

Figure 9:
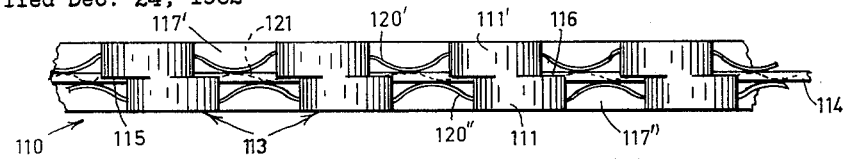
FIG. 9 is a top view of the fastener member shown in FIG. 8.
Figure 8:
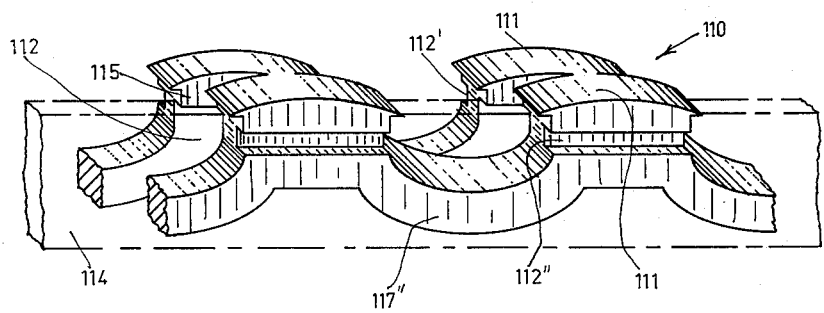
FIG. 8 is a fragmentary perspective view of a modified fastener member incorporating features disclosed in my copending application Ser. No. 791,398.

In FIGS. 8 and 9 I have shown a modified fastener 110 whose links 113 consist of two arcuate head portions 111′, 111″ which overhang the gaps between successive links, in the same manner as do the heads 11 in the preceding embodiment, and are mutually offset to form cheeks 115 and 116. Grooves 112′, 112″ are fashioned in the outer surfaces of the links 113 to receive fillets 120′, 120″ which are secured by stitching 121 to the fabric strip 114, the latter entering a recess 112 which rises within each link from its bottom to a level higher than that of the grooves 112′, 112″. The limbs 117′, 117″ are disposed below the level of these grooves to bear upon the strip 114 from opposite sides and to form a guide path for the slider (not shown in these figures). It will be apparent that the cheeks 115 and 116, lying within the median longitudinal plane of the fastener member, form abutments contacted by corresponding cheeks of a coacting fastener member to prevent relative lateral displacement.

Figure 10:
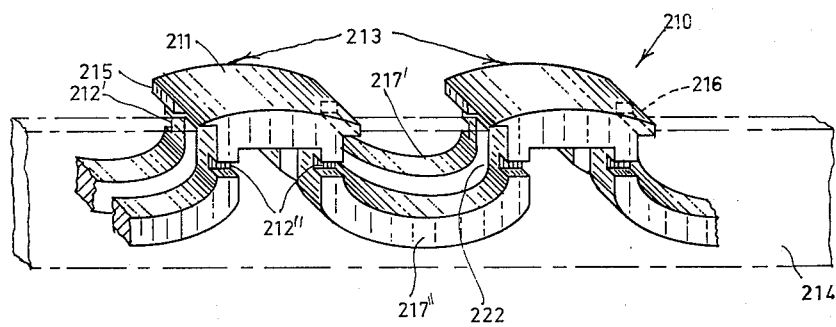
FIG. 10 is a perspective view similar to FIG. 8, illustrating a modification.

The fastener member 210 shown in FIG. 10 is generally similar to member 110, except that its links 213 have unitary heads 211 and that the grooves 212′, 212″ are formed on the upper portions of the downwardly curved limbs 217′ and 217″ so that each link has two such grooves on each of its exposed surfaces. The fabric strip 214 is again receivable in a recess 222 of each link. Interengagement in a manner preventing relative transverse displacement is assured by projections 215 and complementary recesses 216 on the underside of the overhanging lip portion of each head 211; naturally, the formations 215 and 216 are representative of a variety of means for maintaining the alignment between co-operating fastener halves.

As will be apparent from FIG. 11, in which two fastener halves 210A and 210B are secured to tapes 214A and 214B by fastening cords 220A and 220B, the aforementioned lip portions of the heads 211A, 211B interlock when slider 19 has passed them in a closing direction; the limbs 217A, 217B are, of course, sufficiently flexible to permit such interlocking. Essentially the same coaction takes place when the fastener members 210A and 210B are replaced by members such as shown at 10 and 11 in preceding figures.

While the fastener members 10, 110 and 210 have been shown provided with bottom recesses 22, 122, 222 designed to receive an edge of a strip to be straddled thereby, it is also possible to apply the principles herein disclosed to an arrangement in which the fastener half merely overlies the strip with its heads projecting beyond the strip edge. The fastener members 110 and 210, for example, may be readily modified by omission of their recesses 122, 222 and their grooves 112′, 212′ to function in this manner.

Although several embodiments of the invention have been described and illustrated, further modifications thereof are believed to be readily apparent to persons skilled in the art and are intended to be embraced within the spirit and scope of the invention as defined in the appended claims.

I claim:

1. A slide-fastener member comprising an undulating flexible chain of integrally molded links of plastic material rigidly interconnected along one of two opposite sides of the chain and separated by transverse gaps at the other of said opposite sides, said links being provided at said other opposite side with overhanging heads projecting longitudinally of the chain into said gaps for interlocking engagement with like heads on a co-operating slide-fastener member, each of said links having two opposite lateral surfaces which extend substantially transversely to said opposite sides and are each provided with a notch longitudinally aligned with corresponding notches on all other links, each link further having a recess extending toward said heads from said one opposite side between said lateral surfaces, said notches terminating at said gaps whereby a fillet disposed in the aligned notches can be sewn through said gaps onto a fabric edge received in said recess, said chain being a meandering rod composed of generally U-shaped links lying in equispaced transverse planes and connecting limbs alternately disposed on opposite sides of a longitudinal plane bisecting said links, said heads being constituted by flattened enlargements on the bight portion of each U, said notches being incisions in the legs of each U.

2. In combination, a strip of sheet material; a slide-fastener member extending along an edge of said strip, said member comprising a flexible chain of rigidly interconnected links partly overlying said strip and projecting beyond said edge, the projecting part of said member forming spaced-apart heads interlockingly engageable with like heads on a co-operating slide-fastener member, the overlying part of said member being provided on the side opposite said strip with aligned notches extending parallel to said edge; a fillet received in said notches on an exposed side of said member, and stitch means securing said fillet to said strip, thereby holding said member in place thereon.

3. In combination, a strip of sheet material; a slide-fastener member extending along an edge of said strip, said member comprising a flexible chain of rigidly interconnected links partly straddling said strip and projecting beyond said edge, the projecting part of said member forming spaced-apart heads interlockingly engageable with like heads on a co-operating slide-fastener member, the straddling part of said member being provided on its outer surfaces at both sides of said strip with aligned notches extending parallel to said edge; a pair of fillets respectively received in said notches on opposite sides of said strip, and stitch means securing said fillets to said strip, thereby holding said member in place thereon.

4. In combination, a strip of sheet material; a slide-fastener member extending along an edge of said strip, said member comprising a meandering rod composed of generally U-shaped links and connecting limbs alternately contacting opposite sides of said strip, said links straddling said sheet and projecting beyond said edge, said links being flattened at the bight of the U into heads interlockingly engageable with like heads on a co-operating slide-fastener member, said links being further provided at the legs of the U with aligned notches extending parallel to said edge on both sides of said strip; and attaching means lodged in said notches, said attaching means being anchored to said strip for holding said member in place thereon.

5. In combination, a strip of sheet material; a slide-fastener member extending along an edge of said strip, said member comprising a meandering rod composed of generally U-shaped links and connecting limbs alternately contacting opposite sides of said strip, said links straddling said sheet and projecting beyond said edge, said links being flattened at the bight of the U into heads interlockingly engageable with like heads on a co-operating slide-fastener member, said links being further provided at the legs of the U with aligned notches extending parallel to said edge on both sides of said strip; and attaching means including a pair of threads forming a double chain stitch lodged in said notches, one of said threads passing through said strip between successive links for holding said member in place thereon.

6. The combination defined in claim 5 wherein said attaching means further includes a fillet engaged by said one of said threads and lodged in said notches on one side of said strip.

7. In combination, a strip of sheet material; a slide-fastener member extending along an edge of said strip, said member comprising a meandering rod composed of generally U-shaped links and connecting limbs alternately contacting opposite sides of said strip, said links straddling said sheet and projecting beyond said edge, said links being flattened at the bight of the U into heads interlockingly engageable with like heads on a co-operating slide-fastener member, said links being further provided at the legs of the U with aligned notches extending parallel to said edge on both sides of said strip; a fillet received in said notches on an exposed side of said member, and stitch means securing said fillet to said strip, thereby holding said member in place thereon.

8. In combination, a strip of sheet material; a slide-fastener member extending along an edge of said strip, said member comprising a meandering rod composed of generally U-shaped links and connecting limbs alternately contacting opposite sides of said strip, said links straddling said sheet and projecting beyond said edge, said links being flattened at the bight of the U into heads interlockingly engageable with like heads on a co-operating slide-fastener member, said links being further provided at the legs of the U with aligned notches extending parallel to said edge on both sides of said strip; a pair of fillets received in said notches on opposite sides of said strip, and stitch means securing said fillets to said strip, thereby holding said member in place thereon.

References Cited by the Examiner

UNITED STATES PATENTS

| | | | |
|---|---|---|---|
| 2,979,796 | 4/1961 | Morin | 24—205.1 |
| 2,996,780 | 8/1961 | Porepp | 24—205.16 |
| 3,047,924 | 8/1962 | Wilcken | 24—205.13-8 |
| 3,063,119 | 11/1962 | Diekermann | 24—205.13-5 |
| 3,063,120 | 11/1962 | Steingrubner | 24—205.13-5 |

FOREIGN PATENTS

| | | |
|---|---|---|
| 551,821 | 11/1956 | Belgium. |
| 568,859 | 7/1958 | Belgium. |
| 1,238,148 | 6/1960 | France. |
| 1,232,000 | 10/1960 | France. |
| 1,259,243 | 3/1961 | France. |
| 898,611 | 6/1962 | Great Britain. |
| 871,455 | 6/1961 | Great Britain. |
| 575,938 | 4/1958 | Italy. |
| 259,106 | 1/1949 | Switzerland. |

BERNARD A. GELAK, *Primary Examiner.*

DONLEY J. STOCKING, *Examiner.*